March 18, 1958   F. J. KAHL ET AL   2,826,798
SNAP FASTENER
Filed May 9, 1955

INVENTORS
FRANK J. KAHL
ELBERT M. COPLEN
BY Elliott & Pastoriza
ATTORNEYS

United States Patent Office 2,826,798
Patented Mar. 18, 1958

2,826,798

SNAP FASTENER

Frank J. Kahl, Los Angeles, and Elbert M. Coplen, Venice, Calif.

Application May 9, 1955, Serial No. 506,965

1 Claim. (Cl. 24—238)

This invention relates generally to a fastening device and more particularly to a snap fastener which locks itself in the closed position. The invention, in the embodiment shown and described, has particular features that are desirable when the fastener is employed in association with leashes or halters for animals; however, it will be appreciated that the snap fastener according to the scope of the present invention has an unlimited number of applications, including, for example its use with guy wires, safety belts, tent ropes, and the like.

There are many different types of well known snap fasteners adaptable for use with halters and leashes for animals. The problem with such fasteners is that the more simply operated types, that is the types which may be easily opened and closed, are not securely locked in the closed possition. Thus, an unpredictable movement of the animal may accidentally open the fastener. On the other hand, the fasteners which are securely locked in the closed position are oftentimes cumbersome and awkward to open and close.

A further problem is that present day fasteners are oftentimes difficult to hook through and clasp onto chain links or rings of relatively thick dimensions. This difficulty results from the fact that many designs do not have the ring section well forward on the main body of the fastener.

It is therefore an obect of the present invention to provide a fastener which will be securely locked in the closed position, and yet which may be simply and quickly opened and closed.

Another object is to provide a fastener having a structure such that it may be quickly and easily hooked onto a ring, chain link, or other member of relatively thick dimensions.

A further object is to provide a fastener which is simple and rugged in its construction, and yet which may be produced more economically than present day fasteners.

These and other objects and advantages of the present invention are attained by providing a snap fastener having a generally cylindrical body, one end of which is cut away to form an open ring section. The ring section has a cross-section approximating that of the ordinary hook, and thus the ring section may be quickly and easily inserted through a chain link, ring, or the like. The other end of the main cylindrical body is hollowed out so that the proejcting plug of a tailpiece member may be secured within and to the cylindrical body of the fastener.

A tubular member is coaxially disposed about the cylindrical body. This tubular member is dimensioned for backward and forward movement in an axial direction on the cylindrical body, and has a forward end shaped to mate with and close the ring section when the tubular member is in a given forward axial position.

Guiding means are provided in association with the tubular member and the cylindrical body to limit and guide backward and forward axial movement of the tubular member. The guiding means further functions to secure the tubular member against rotation relative to the cylindrical body, and, thus, assure that when the tubular member is pushed forward, its forward end will always be properly circumferentially aligned with the ring section on the cylindrical body. In addition, locking means are provided on the cylindrical body, which snap into a position locking the tubular member against axial movement when the forward end of the tubular member is positioned to close the ring section.

A better understanding of the invention will be had by reference to the accompanying drawings, in which.

Figure 1:
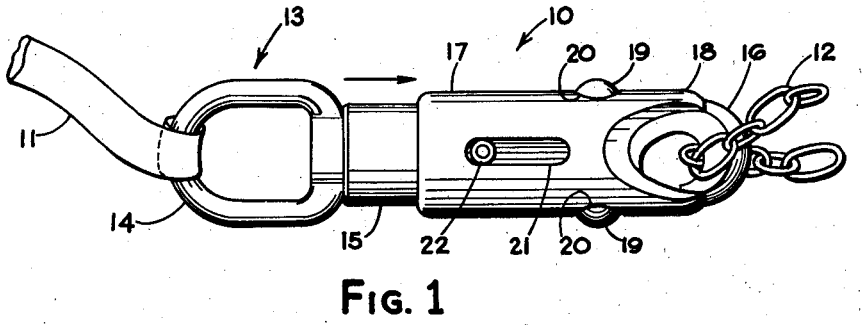
Fig. 1 is a perspective view of a preferred embodiment of the snap fastener of the present invention; the fastener being shown in a closed position.

In Fig. 1, there is shown a preferred embodiment of the snap fastener of the present invention, generally designated by the numeral 10. The fastener 10 is shown connected between a halter or leash 11 and a chain 12, which in the application chosen for illustrative purposes may be disposed around the neck of a horse, dog, or other animal.

The fastener 10 consists of three main structural members. At the back end of the fastener is a tailpiece member, generally designated by the numeral 13, including an eye portion 14 to which the leash 11 may be fastened. The tailpiece 13 is secured to a cylindrical body 15 which extends forward to terminate in an open ring section 16. Coaxially disposed about the cylindrical body 15 is a tubular member 17, having an internal diameter such that it is loosely fitted around the cylindrical body 15, thus permitting sliding, axial movement of the tubular member 17 along the body 15.

In the view of Fig. 1, the tubular member 17 has been pushed forward so that its forward end 18 closes off the ring section 16. In this forward, closed position of the fastener 10, balls 19 are biased to protrude from the cylindrical body 15 through apertures 20 in the tubular member to provide locking means preventing inadvertent or accidental opening of the fastener. The balls 19 securely restrain the tubular member 17 from axial movement backward, and thus assure that the ring section 16 will remain closed by the forward end 18 of the tubular member.

In order to guide the tubular member 17 as it is moved backwards or forwards along the cylindrical body 15, a slot 21 is shown cut in the sidewall of the tubular member which cooperates with a pin 22 projecting from the periphery of the cylindrical body 15. The slot 21 and pin 22 not only act together as a guiding means, preventing relative rotation between the tubular member and the cylindrical body, but they also cooperate together to limit axial movement of the tubular member 17 to a given distance dependent on the length of the slot 21. In addition, this guiding means assures that proper mating will occur between the forward end 18 of the tubular member and the ring section 16, as well as accurately positioning the apertures 19 with respect to the balls 18 so that the fastener will be securely locked in its closed position.

Figure 2:
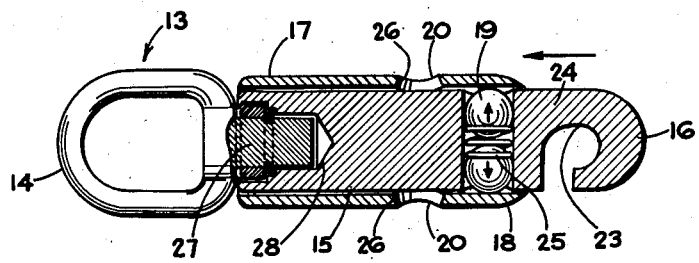
Fig. 2 is a cross-sectional of the fastener of Fig. 1 in open position.

In Fig. 2, the fastener 10 is shown in the open position with the tubular member 17 pushed to a backward position so that its forward end 18 no longer closes a throat area 23 of the ring section 16. In this sectional view, it may be seen that the balls 19 have been depressed by the backward movement of the tubular member 17 into a chamber 24 against the force of spring 25 which normally biases the balls 19 radially outwards.

It will further be seen in the view of Fig. 2 that the apertures 20 have inclined side walls 26, which enable the balls 19 to move more easily into and out of the apertures. Thus, an operator of the fastener need merely exert a radially inward presure on the balls 19 as by grasping between two fingers, while at the same time pressing the tubular member 17 axially backwards. The tubular member 17 will then slide readily back along the cylindrical body 15 to open the fastener. When closing the fastener 10, the operator need merely exert a forward axial pressure on the tubular member 17, and it will slide along the cylindrical body 15, guided by the pin 22 and slot 21, until the apertures 20 are aligned with the balls 19, at which time the balls will snap into their protruding or locking position. It will be evident that the apertures 20 must be large enough so that the balls 19 will be allowed to protrude sufficiently to securely lock the tubular member 17; on the other hand, the apertures must be small enough to effectively prevent escape of the balls 19.

Figures 3, 4:
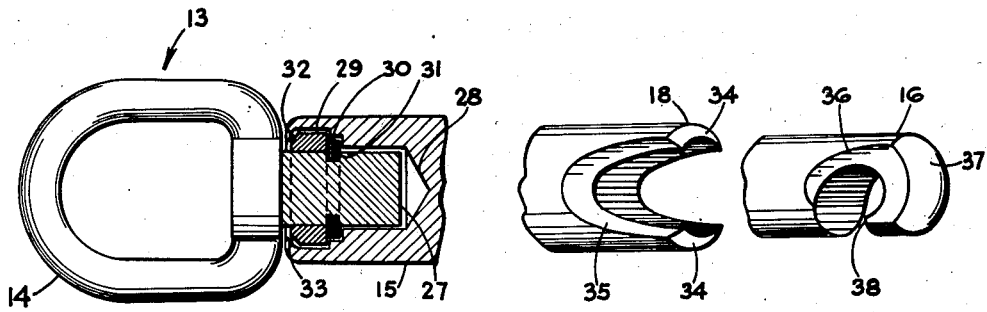
Fig. 3 is an enlarged cross-section of the tailpiece shown in Fig. 2.
Fig. 4 is a partial exploded view of the forward portion of the fastener of Fig. 1; and, Fig. 5 is a view of modified guiding means for the fastener.

In the sectional view of Fig. 2, it is seen that the tailpiece 13 includes a plug 27 projecting into and secured within a hollowed out portion 28 of the cylindrical body 15. Reference is had to Fig. 3 for the structural details of this portion of the fastener.

There is shown immediately adjacent the eye portion 23 of the tailpiece a sleeve 29 which encircles the plug 27. The sleeve 29 is loosely mounted so that it may rotate on the plug 27. The sleeve is restrained against forward axial movement on the plug 27 by an annular washer 30, which is keyed into a recessed portion 31 of the plug 27. For ease of assembly the washer may be of the split type.

The sleeve 29 cooperates directly with the cylindrical body 15 to secure the tailpiece 13 to the main portion of the fastener 10. In this regard, the back end 32 of the sleeve 29 is angulated to cooperate with a similarly angulated back end 33 of the cylindrical body 15. In actual manufacture, the end 33 is spun down around the sleeve 29.

With this type of assembly, the tailpiece 13 is free to rotate with respect to the cylindrical body 15 of the fastener regardless of the movement of the animal and regardless of the axial load which may be imposed on the fastener 10. For further strength and ruggedness, the the hollowed out portion 28 may have a stepped contour of varying diameter to accommodate, as shown, the different diameters of the sleeve 29, washer 30, and plug 27.

Fig. 4 shows the interrelation of the respective parts of the forward end 18 of the tubular member 17 and the ring section 16 of the cylindrical body 15. The forward end 18 has two arcuate sections 34 which are formed by the beveled side sections 35. Similarly, the ring section 16 has beveled side sections 36 defining an arcuate section 37. The arcuate section 37 terminates in a tip portion 38.

When the tubular member 17 is pressed axially forward to close the fastener 10, one of the arcuate sections 34 mates with the tip portion 38, and the side sections 35 form a continuous side surface with the side sections 36, so that the smooth, rounded contour, as shown in Fig. 1, results when the fastener is in a closed position. Thus, there are no sharp edges, points, or irregular structures to snag, cut, scratch, or otherwise harm the animal or operator.

Figure 5:
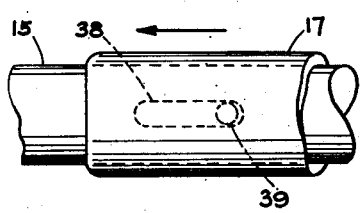

In Fig. 5, there is shown a modified version of the guiding means of the illustrated embodiment of the fastener 10. Instead of a slot 21 on the tubular member 17, a groove 38 is formed in the periphery of the cylindrical body 15. Correspondingly, instead of a pin 22 on the cylindrical body 15, a projection 39 is formed on the inner wall of the tubular member 17. It will be apparent that this modified guiding means functions similarly to the pin and slot arrangement of Fig. 1.

From the above description it will be apparent that the present invention provides a simple and rugged fastener which may be economically produced. Further, the construction is such that the fastener will be securely locked in the closed position and yet may be simply and rapidly opened.

Modifications of the fastener falling within the scope and spirit of the present invention will occur to those skilled in the art. The invention, therefore, is not to be thought of as limited to the precise structure shown and described herein.

What is claimed is:

A snap fastener comprising in combination: a cylindrical body; said cylindrical body having one end cut away to form an open ring section and having its other end terminating in a hollowed out portion; a tail piece having a projecting plug for securing within said hollowed out portion; said plug having an annular recessed portion; a washer keyed into said recessed portion; a sleeve encircling said plug, said sleeve being held against forward axial movement by said annular washer; a tubular member co-axially disposed about said cylindrical body and dimensioned for backward and forward movement in an axial direction on said cylindrical body, said tubular member having a forward end shaped to mate with and close said ring section when said tubular member is in a given forward position; guiding means associated with said tubular member and said cylindrical body for guiding and limiting backward and forward movement of said tubular member, said guiding means also acting to substantially secure said tubular member against rotation relative to said cylindrical body; means defining at least one aperture extending radially outward through the side walls of said tubular member, the wall of said aperture describing the shape of a conical frustum; a chamber in said cylindrical body extending radially inward from its surface, said aperture registering with said chamber when said tubular member is in said given forward position; at least one ball disposed within said chamber; a spring member disposed within said chamber and biasing said ball outwardly, said ball being dimensioned to seat and partially protrude through said aperture when said tubular member is in said given forward position, thereby locking said tubular member against axial movement.

References Cited in the file of this patent

UNITED STATES PATENTS

| | | |
|---|---|---|
| 302,509 | Mauthner | July 22, 1884 |
| 345,923 | Riggle | July 20, 1886 |
| 486,904 | Smitten | Nov. 29, 1892 |
| 524,782 | Mason | Aug. 21, 1894 |
| 714,144 | Chapman | Nov. 25, 1902 |
| 1,245,678 | Canfield | Nov. 6, 1917 |
| 2,010,277 | Smith | Aug. 16, 1935 |
| 2,625,005 | Myers | Jan. 13, 1953 |

FOREIGN PATENTS

| | | |
|---|---|---|
| 259,739 | Germany | May 14, 1913 |
| 677,224 | Great Britain | Aug. 13, 1952 |